United States Patent
Ogasa

(10) Patent No.: US 9,954,217 B2
(45) Date of Patent: Apr. 24, 2018

(54) ALL-SOLID SECONDARY BATTERY

(71) Applicant: OHARA INC., Sagamihara-shi, Kanagawa (JP)

(72) Inventor: Kazuhito Ogasa, Sagamihara (JP)

(73) Assignee: OHARA INC., Kanagawa (JP)

( * ) Notice: Subject to any disclaimer, the term of this patent is extended or adjusted under 35 U.S.C. 154(b) by 830 days.

(21) Appl. No.: 13/894,520

(22) Filed: May 15, 2013

(65) Prior Publication Data

US 2013/0309551 A1 Nov. 21, 2013

(30) Foreign Application Priority Data

May 18, 2012 (JP) .................. 2012-114549

(51) Int. Cl.
| | |
|---|---|
| H01M 6/42 | (2006.01) |
| H01M 4/13 | (2010.01) |
| H01M 10/04 | (2006.01) |
| H01M 10/052 | (2010.01) |
| H01M 10/0562 | (2010.01) |
| H01M 10/0585 | (2010.01) |

(52) U.S. Cl.
CPC ......... *H01M 4/13* (2013.01); *H01M 10/0463* (2013.01); *H01M 10/052* (2013.01); *H01M 10/0562* (2013.01); *H01M 10/0585* (2013.01); *H01M 10/0427* (2013.01); *H01M 2300/0068* (2013.01)

(58) Field of Classification Search
CPC .. H01M 4/13; H01M 10/0463; H01M 10/052; H01M 10/0562; H01M 10/0585; H01M 10/0427; H01M 2/1673
See application file for complete search history.

(56) References Cited

U.S. PATENT DOCUMENTS

| | | | | |
|---|---|---|---|---|
| 4,226,925 A | * | 10/1980 | Ikeda | H01M 2/22 429/161 |
| 2006/0032046 A1 | * | 2/2006 | Nathan | C25D 9/04 29/623.5 |
| 2007/0269714 A1 | * | 11/2007 | Watanabe | H01M 10/0436 429/120 |
| 2008/0081257 A1 | | 4/2008 | Yoshida | |

FOREIGN PATENT DOCUMENTS

| | | |
|---|---|---|
| JP | 2006261008 A2 | 9/2006 |
| JP | 2008078119 A2 | 4/2008 |
| JP | 2010225432 A2 | 10/2010 |
| JP | 2011-198692 | 10/2011 |

OTHER PUBLICATIONS

JP 2006-261008 English Translation obtained via JPO on Apr. 13, 2016.*
Japanese Office Action dated Oct. 27, 2015 issued in the corresponding Japanese patent application No. 2012-114549.

* cited by examiner

*Primary Examiner* — Jimmy Vo
(74) *Attorney, Agent, or Firm* — Rankin, Hill & Clark LLP

(57) ABSTRACT

An all-solid secondary battery has first electrode layers, and second electrode layers laminated on both sides of the first electrode layer with solid electrolyte layers placed in between, wherein at least one first opening is provided which penetrates the first electrode layer and the solid electrolyte layers adjacent to the first electrode layer, and the second electrode layers present on both sides of the first electrode layer are in contact with each other on the inside of the first opening.

13 Claims, 4 Drawing Sheets

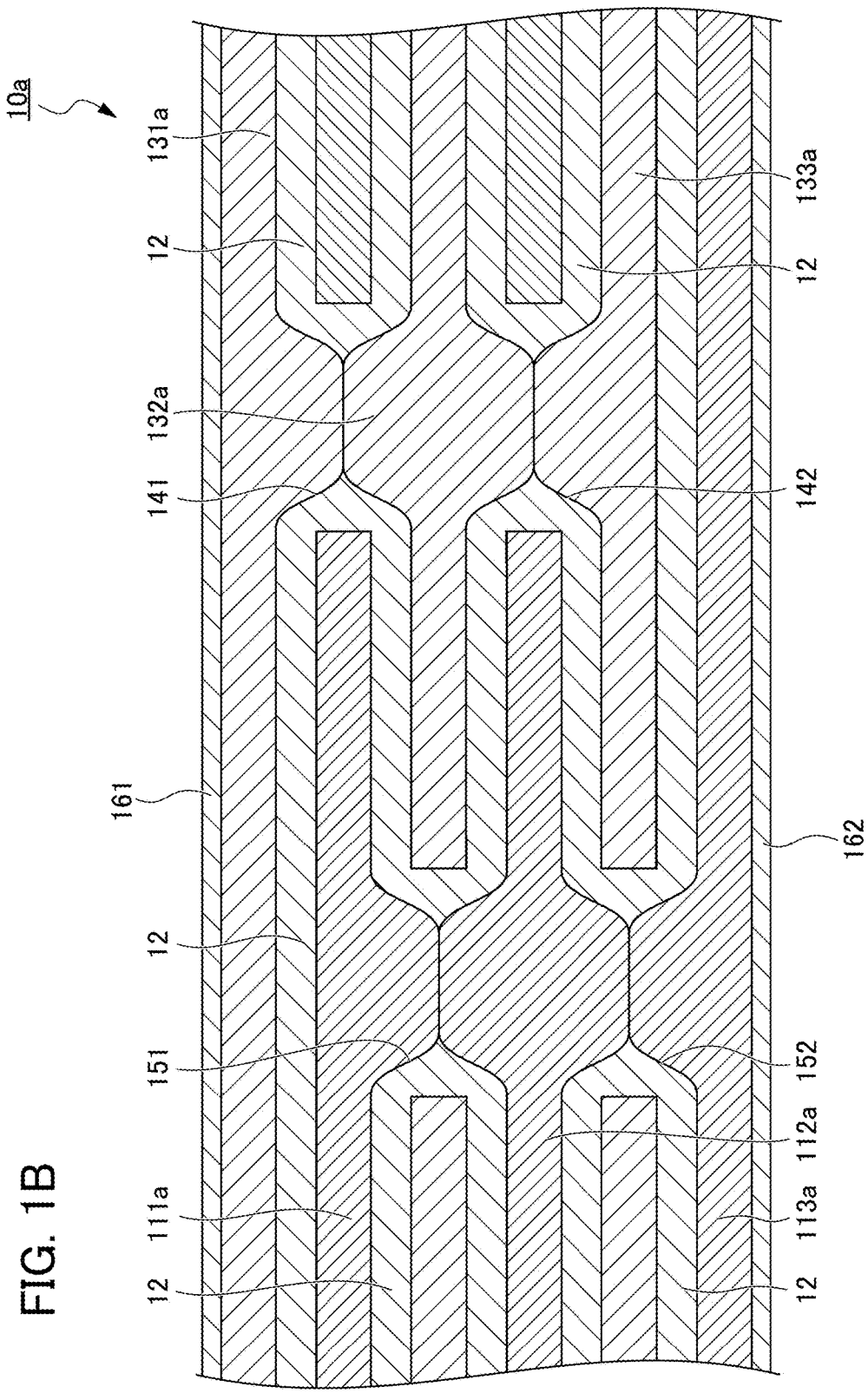

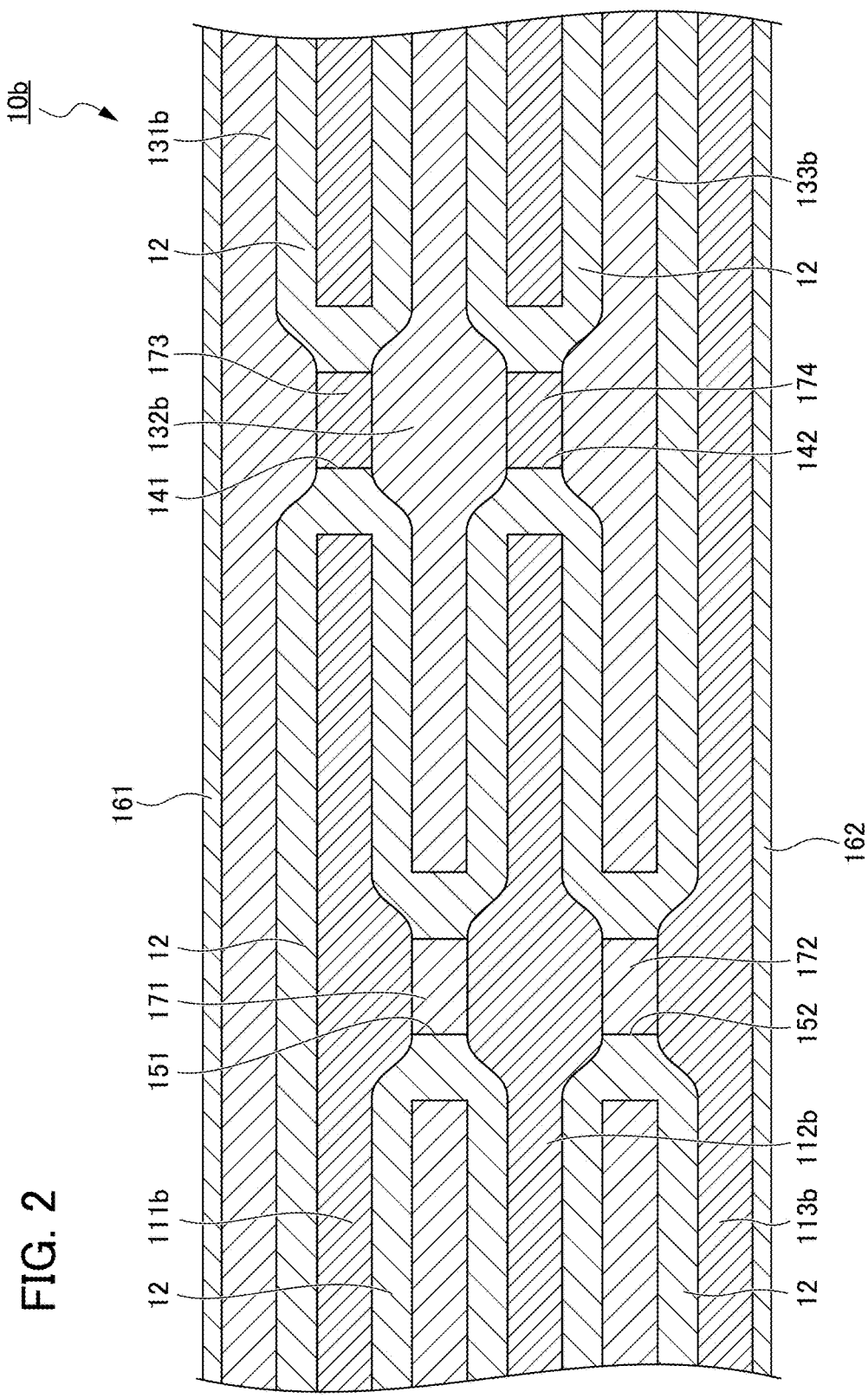

ALL-SOLID SECONDARY BATTERY

This application is based on and claims the benefit of priority from Japanese Patent Application No. 2012-114549, filed on 18 May 2012, the content of which is incorporated herein by reference.

BACKGROUND OF THE INVENTION

Field of the Invention

The present invention relates to an all-solid secondary battery.

Related Art

An all-solid secondary battery, using an inorganic solid electrolyte and not using an organic substance even for an electrode is free of problems concerning leakage of organic electrolytic solution and generation of gas from the organic electrolytic solution, and is thus expected to be a safe battery. Further, the all-solid secondary battery is less likely to produce a side reaction other than battery reactions as compared to liquid batteries, and can thus be expected to have a long operating life as compared to liquid batteries.

As an example of the all-solid secondary battery, Patent Document 1 discloses one having a structure where negative electrode layers each formed by lamination of negative electrode active material layers on both sides of a negative electrode current collector layer and positive electrode layers each formed by lamination of positive electrode active material layers on both sides of a positive electrode current collector layer are alternately laminated via solid electrolyte layers, and active materials are carried on conductive materials in end electrodes connected to these positive electrode layers and negative electrode layers.

[Patent Document 1] Japanese Unexamined Patent Application, Publication No. 2011-198692

SUMMARY OF THE INVENTION

In the all-solid secondary battery having the laminated structure as disclosed in Patent Document 1, with the negative electrode layers and the positive electrode layers being alternately laminated via the solid electrolyte layers, the all-solid secondary battery has such a configuration as to be arrayed in a lamination direction, and is thus expected to enhance the discharge capacity per unit area. However, in the laminated structure disclosed in Patent Document 1, the current collector layer irrelative to the discharge capacity is formed in each of the negative electrode layers and the positive electrode layers, and hence it cannot be said that the discharge capacity per unit volume is sufficiently high. On the other hand, in the case of trying to form the negative electrode layers and the positive electrode layers only of the active material layers without using the current collector layers in the all-solid secondary battery of Patent Document 1, electrons travel to the end electrodes through the negative layers and the positive layers to cause an increase in internal resistance of the all-solid secondary battery, thereby contrarily leading to a decreased discharge capacity and a smaller output current from the all-solid secondary battery.

Further, increasing the discharge capacity per unit volume requires the solid electrolyte layers to be thinly formed (e.g. a thickness of the order of 1 to 2 pin) and the electrode layers to be thickly formed. In the laminated structure and manufacturing method disclosed in Patent Document 1, when a solid-electrolyte green sheet layer (a solid-electrolyte paste layer in Patent Document 1) is thinly formed and an electrode green sheet layer (a positive electrode active material paste layer or a negative electrode active material paste layer in Patent Document 1) is thickly laminated (e.g. a thickness of the order of 10 to 20 μm) on part of the above formed green sheet layer, a problem occurs where the solid-electrolyte green sheet layer is torn at the time of removing the green sheet group, following lamination, from a support such as a PET film.

On the other hand, when the thick electrode-layer green sheet is laminated over the thin solid-electrolyte green sheet, a problem occurs where the positive electrode and the negative electrode are short-circuited on the end surface of the green sheet group.

Accordingly, with the laminated structure and using the manufacturing method disclosed in Patent Document 1, it is difficult to form the electrode layer thickly while forming the solid electrolyte layer thinly, and it is thus difficult to increase the discharge capacity per unit volume.

The present invention was created in view of the problems described above, and has an objective to provide an all-solid secondary battery with a sufficiently high discharge capacity per unit volume, while suppressing an increase in internal resistance.

The present inventors found that through contact between second electrode layers, present on both sides of a first electrode layer, on the inside of a first opening provided in the first electrode layer, it is possible to circulate electrons through the first opening, so as to transfer the electrons in the lamination direction, thereby completing the present invention.

Specifically, the present invention provides what is described below.

(1) An all-solid secondary battery, having first electrode layers, and second electrode layers laminated on both sides of the first electrode layer with solid electrolyte layers placed in between, wherein at least one first opening is provided which penetrates the first electrode layer and the solid electrolyte layers adjacent to the first electrode layer, and the second electrode layers present on both sides of the first electrode layer are in contact with each other on the inside of the first opening.

(2) The all-solid secondary battery according to (1), wherein an inner wall of the first opening is covered by a solid electrolyte.

(3) The all-solid secondary battery according to (1) or (2), wherein a plurality of first electrode layers and a plurality of second electrode layers are alternately laminated with the solid electrolyte layer placed in between them, the second electrode layer is provided at one end of the lamination direction, and the first opening is provided so as to penetrate each of the first electrode layers and the solid electrolyte layers adjacent thereto.

(4) The all-solid secondary battery according to any of (1) to (3), wherein the first electrode layers are provided on both sides of the second electrode layer with the solid electrolyte layers placed in between, at least one second opening is provided which penetrates the second electrode layer and the solid electrolyte layers adjacent to the second electrode layer, and the first electrode layers present on both sides of the second electrode layer are in contact with each other on the inside of the second opening.

(5) The all-solid secondary battery according to (4), wherein an inner wall of the second opening is covered by a solid electrolyte.

(6) The all-solid secondary battery according to (4) or (5), wherein a plurality of first electrode layers and a plurality of second electrode layers are alternately laminated with the solid electrolyte layers placed in between, the first electrode layer is provided at one end of the lamination direction and the second electrode layer is provided at the other end of the lamination direction, the first opening is provided so as to penetrate each of the first electrode layers provided other than at the one end and the solid electrolyte layers adjacent thereto, and the second opening is provided so as to penetrate each of the second electrode layers provided other than at the other end and the solid electrolyte layers adjacent thereto.

(7) The all-solid secondary battery according to any of (4) to (6), wherein the second electrode layer has an island-like part encompassed by the second opening.

(8) The all-solid secondary battery according to any of (1) to (7), wherein the first electrode layer has an island-like part encompassed by the first opening.

(9) The all-solid secondary battery according to any of (1) to (8), wherein the thickness of the solid electrolyte layer is in the range of no smaller than 0.1 μm and no greater than 50 μm.

(10) The all-solid secondary battery according to any of (1) to (9), wherein one of the first electrode layers and the second electrode layers is a positive electrode layer and the other is a negative electrode layer.

According to the present invention, it is possible to provide an all-solid secondary battery with a sufficiently high discharge capacity per unit volume, while suppressing an increase in internal resistance.

BRIEF DESCRIPTION OF THE DRAWINGS

FIG. 1B is a sectional view showing an example of a power generating element of the all-solid secondary battery in the first embodiment;

FIG. 2 is a sectional view showing an example of a power generating element of an all-solid secondary battery in a second embodiment.

DETAILED DESCRIPTION OF THE INVENTION

An all-solid secondary battery of the present invention has first electrode layers, and second electrode layers laminated on both sides of the first electrode layer with solid electrolyte layers placed in between, wherein at least one first opening is provided which penetrates the first electrode layer and the solid electrolyte layers adjacent to the first electrode layer, and the second electrode layers present on both sides of the first electrode layer are in contact with each other on the inside of the first opening.

Hence the second electrode layers present on both sides of the first electrode layer come into contact and conduction with each other on the inside of the first opening, thereby to reduce the transfer distance of electrons in the second electrode layer. For this reason, it is possible to suppress an increase in internal resistance of the all-solid secondary battery even without provision of a current collector on the second electrode layer.

Additionally, the lack of requiring the provision of the current collector at the time of manufacturing the all-solid secondary battery leads to an enhancement of discharge capacity per unit volume of the all-solid secondary battery. Hence it is possible to provide an all-solid secondary battery with a sufficiently enhanced discharge capacity per unit volume, while suppressing an increase in internal resistance.

Hereinafter, embodiments of the all-solid secondary battery of the present invention and the manufacturing method thereof will be described in detail with reference to FIGS. 1 and 2 as necessary, but the present invention is not restricted to the embodiments below, and a modification may be added to it as appropriate and then implemented within the scope of the object of the present invention. It is to be noted that although repeated explanations may be omitted as appropriate, this does not restrict the scope of the invention.

Basic Form of all-Solid Secondary Battery

Figure 1A:
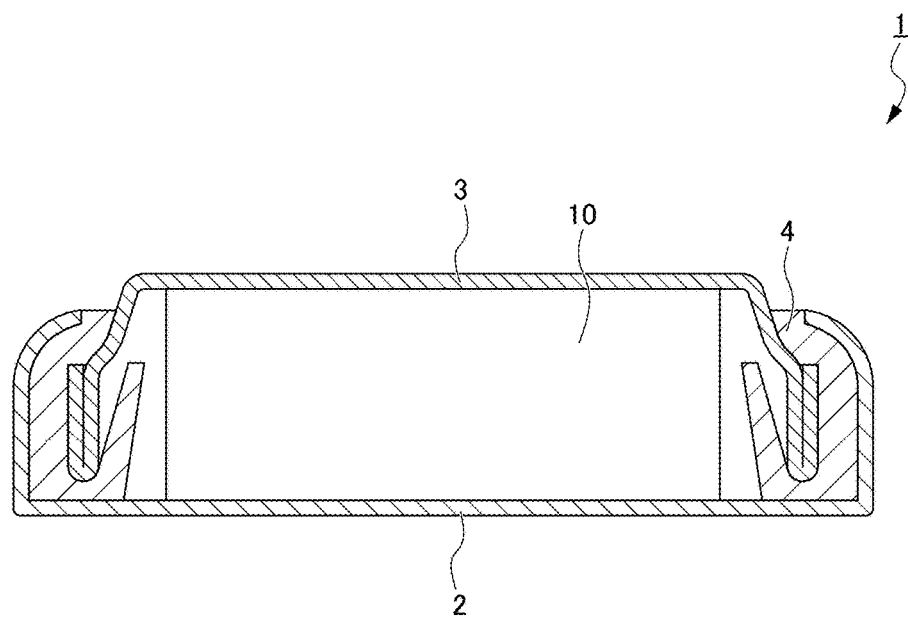
FIG. 1A is a sectional view showing an example of an all-solid secondary battery in a first embodiment.

For example, as shown in FIG. 1A, an all-solid secondary battery 1 of the present invention is provided with a power generating element 10 including first electrode layers, second electrode layers and solid electrolyte layers, a metal case 2 being in conduction with the second electrode layer of the power generating element 10 and serving as a first electrode terminal, a metal sealing plate 3 being in conduction with the second electrode layer of the power generating element 10 and serving as a second electrode terminal, and an insulator 4 provided so as to insulate the metal case 2 and the metal sealing plate 3 and fix these.

FIG. 1A is a sectional view showing an example of the all-solid secondary battery 1.

In the first embodiment, a power generating element 10a is provided with first electrode layers 111a to 113a and second electrode layers 131a to 133a laminated on both sides of the first electrode layers 111a to 113a with solid electrolyte layers 12 placed in between. This power generating element 10a is provided with a first current collector layer 162 so as to be placed between the first electrode layer 113a and the metal case 2, and a second current collector layer 161 so as to be placed between the second electrode layer 131a and the metal sealing plate 3.

FIG. 1B is a sectional view showing an example of the power generating element 10a of the all-solid secondary battery 1.

(First Electrode Layer and Second Electrode Layer)

The first electrode layers 111a to 113a and the second electrode layers 131a to 133a constitute the two poles of the all-solid secondary battery 1. Here, one of the first electrode layers 111a to 113a and the second electrode layers 131a to 133a are positive electrode layers containing positive electrode active materials, and the other are negative electrode layers containing negative electrode active materials. At this time, the first electrode layers 111a to 113a may be the positive electrode layers and the second electrode layers 131a to 133a may be the negative electrode layers, or the second electrode layers 131a to 133a may be the positive electrode layers and the first electrode layers 111a to 113a may be the negative electrode.

In the present embodiment, a plurality of first electrode layers 111a to 113a and a plurality of second electrode layers 131a to 133a are alternately laminated with the solid electrolyte layers placed in between. Accordingly, the second electrode layer 131a formed at the other end becomes a second electrode of the power generating element 10a, and the first electrode layer 113a formed at one end becomes a first electrode of the power generating element 10a. With structures of the current collectors of the first electrode and the second electrode formable in a simpler manner, it is possible to form the all-solid secondary battery 1 into a button-type shape or some other shape even without provision of a special wiring structure so as to seek a reduction in the size and thickness of the all-solid secondary battery 1.

Here, the first electrode layer 113a is provided at one end of the lamination direction of the power generating element 10a, and the second electrode layer 131a is provided at the other end of the lamination direction of the power generating element 10a. Accordingly, whole surface of the first electrode layer 113a formed at the one end becomes the first electrode of the power generating element 10a, and whole surface of the second electrode layer 131a formed at the other end becomes the second electrode of the power generating element 10a. For this reason, it is possible to increase areas of the first electrode and the second electrode and simplify the structures of the first current collector layer 162 and the second current collector layer 161 provided in the first electrode and the second electrode, so as to seek a reduction in the size and thickness of the all-solid secondary battery 1.

The electrical conductivities of the first electrode layers 111a to 113a are set in accordance with thicknesses of the first electrode layers 111a to 113a, and are preferably no smaller than $1 \times 10^{-6}$ S/cm, for example. Accordingly, due to increases in the current flowing in a portion where the first electrode layer 111a and the first electrode layer 112a are in contact with each other and the current flowing in a portion where the first electrode layer 112a and the first electrode layer 113a are in contact with each other, it is possible to reduce the internal resistance of the all-solid secondary battery 1. Furthermore, the electrical conductivities of the second electrode layers 131a to 133a are also preferably in the range of no smaller than $1 \times 10^{-6}$ S/cm for a reason similar to the first electrode layers 111a to 113a. Hence the lower limit for the electrical conductivities of the first electrode layers 111a to 113a and the second electrode layers 131a to 133a are preferably $1 \times 10^{-6}$ S/cm, more preferably $1 \times 10^{-5}$ S/cm, and most preferably $1 \times 10^{-4}$ S/cm.

The thicknesses of the first electrode layers 111a to 113a are preferably no greater than 40 μm. In particular, making the thicknesses of the first electrode layers 111a, 112a, which are formed other than at the one end no greater than 40 μm can reduce electric resistance in the thickness direction of the power generating element 10a. Furthermore, it becomes possible to increase the number of laminated electrode layers per unit volume, so as to facilitate improvement in discharge capacity per unit volume. Out of these, in particular, the thicknesses of the first electrode layers 111a, 112a, which are provided with later-mentioned first openings 141, 142, are made to be no greater than 40 μm, thereby facilitating close arrangement of the second electrode layer 131a and the second electrode layer 132a and close arrangement of the second electrode layer 132a and the second electrode layer 133a, so as to facilitate implementing contact between them. Therefore, the upper limit for the thicknesses of the first electrode layers 111a to 113a is preferably 40 μm, more preferably 30 μm, and most preferably 20 μm. On the other hand, making the thicknesses of the first electrode layers 111a to 113a no smaller than 2 μm leads to an increase in lithium ions which can be occluded in the first electrode layers 111a to 113a, whereby it is possible to ensure a desired discharge capacity in the all-solid secondary battery 1. Furthermore, electrical conductivity in the plane direction of the first electrode layers 111a to 113a can be made sufficient. Therefore, the lower limit for the thicknesses of the first electrode layers 111a to 113a is preferably 2 μm, more preferably 5 μm, and most preferably 10 μm.

Furthermore, the upper limit for the thicknesses of the second electrode layers 131a to 133a is preferably 40 μm, more preferably 30 μm, and most preferably 20 μm, for same reason as the first electrode layers 111a to 113a. The lower limit for the thicknesses of the second electrode layers 131a to 133a is preferably 2 μm, more preferably 5 μm, and most preferably 10 μm, for same reason as the first electrode layers 111a to 113a.

(Solid Electrolyte Layer)

The solid electrolyte layer 12 contains a solid electrolyte to serve as a transfer medium for lithium ions, which is laminated adjacently to at least one surface of each of the first electrode layers 111a to 113a, laminated adjacently to at least one surface of each of the second electrode layers 131a to 133a, and is laminated so as to be placed between each of the first electrode layers 111a to 113a and each of the second electrode layers 131a to 133a. Hence conduction is suppressed while lithium ions are transferred between the first electrode layers 111a to 113a and the second electrode layers 131a to 133a, so as to allow formation of a secondary battery between these layers.

Here, the thickness of the solid electrolyte layer 12 is preferably in the range of not smaller than 0.1 μm and not greater than 50 μm. In particular, making the thickness of the solid electrolyte layer 12 no greater than 50 μm facilitates, for example, close arrangement of the second electrode layer 131a and the second electrode layer 132a on the inside of the first electrode layer 111a, which can thus facilitate implementing contact between the first electrode layers and contact between the second electrode layers. Furthermore, reduction in ion conduction resistance of the solid electrolyte layer 12 can lead to reduction in internal resistance of the all-solid secondary battery 1. Moreover, with the solid electrolyte layer 12 configured to be thinner than the electrode layer, it is possible to increase the number of laminated electrode layers per unit volume, so as to improve discharge capacity and energy density per unit volume. In this case, the upper limit for the thickness of the solid electrolyte layer 12 is preferably 50 μm, more preferably 10 μm, and most preferably 3 μm. On the other hand, making the thickness of the solid electrolyte layer 12 no smaller than 0.1 μm, can reliably suppress conduction between the first electrode layers 111a to 113a and the second electrode layers 131a to 133a. In this case, the lower limit for the thickness of the solid electrolyte layer 12 is preferably 0.1 μm, more preferably 1 μm, and most preferably 2'μm.

(First Opening)

The first opening 141 is provided so as to penetrate the first electrode layer 111a and the solid electrolyte layer 12 adjacent to the first electrode layer 111a. Hence the second electrode layer 131a and the second electrode layer 132a provided on both sides of the first electrode layer 111a enter the inside of the first opening 141 and come into contact with each other, whereby the second electrode layer 131a and the second electrode layer 132a come into conduction with each other, leading to generation of a current in the thickness direction (lamination direction) of these layers. For this reason, even without provision of the end electrodes at the ends of plane direction of the second electrode layers 131a, 132a, electrons can be exchanged between each of a plurality of secondary battery cells formed in the lamination direction, so as to reduce the transfer distance of the electrons on the insides of the second electrode layers 131a, 132a. Hence it is possible to suppress an increase in internal resistance of the all-solid secondary battery 1 even without provision of current collectors on the second electrode layer 131a and the second electrode layer 132a.

Especially from the aspect of where the plurality of first electrode layers 111a to 113a and the plurality of second electrode layers 131a to 133a are alternately laminated with the solid electrolyte layers 12 placed in between as in the present embodiment, the first openings 141, 142 are preferably provided so as to respectively penetrate the plurality of first electrode layers 111a, 112a provided other than at the one end and the solid electrolyte layers 12 adjacent thereto. Therefore, by the second electrode layers 131a to 133a, which are adjacent to the first openings 141, 142, coming into contact with each other respectively in the first openings 141, 142, currents are generated in the lamination direction from the respective second electrode layers 132a, 133a not formed at the other end to the second electrode layer 131a formed at the other end through the insides of the first openings 141, 142. That is, when the second current collector layer 161 is formed on the second electrode layer 131a present at the other end, the second current collector layer 161 comes into conduction with the respective second electrode layers 131a to 133a, whereby it is possible to constitute the all-solid secondary battery 1 without provision of the end electrodes at the ends of the plane direction of the second electrode layers 131a to 133a. Furthermore, a decrease in the sum of the transfer distances of the electrons from the second electrode layers 131a to 133a to the second current collector layer 161 in the power generating element 10a can lead to suppression of an increase in internal resistance of the all-solid secondary battery 1.

Apertures formed on the peripheries of the first openings 141, 142 preferably have circular shapes. This facilitates entry of the second electrode layers 131a to 133a into the first openings 141, 142, and can thus facilitate contact between the second electrode layer 131a and the second electrode layer 132a, and facilitate contact between the second electrode layer 132a and the second electrode layer 133a.

Although the area of the aperture of the first opening 141 is set in accordance with the thicknesses of the first electrode layer 111a and the solid electrolyte layer 12 and the presence or absence of a later-mentioned island-like part, the lower limit for the ratio of total area of the apertures with respect to areas of the first electrode layer 111a and the solid electrolyte layers 12 in the case of the first electrode layer 111a and the solid electrolyte layer 12 being seen in a plane view is preferably 1%, more preferably 3%, and even more preferably 4%. This can facilitate contact between the second electrode layer 131a and the second electrode layer 132a, so as to reduce electric resistance in the portion of the contact between the second electrode layer 131a and the second electrode layer 132a. On the other hand, the upper limit for the ratio of the area of the aperture in the first opening 141 is preferably 10%, more preferably 8%, and even more preferably 5%. With effective areas of the first electrode layer 111a and the solid electrolyte layer 12 thus ensured, it is possible to reduce discharge capacity of the all-solid secondary battery 1. The other first opening 142 has a similar area ratio to that of the first opening 141.

Here, the foregoing ratio of the total area is represented by the following formula.

area ratio (%)=[total area of aperture of first opening 141]/[areas of first electrode layer 111a and solid electrolyte layer 12, including area of first opening 141]×100

Inner walls of the first openings 141, 142 are covered by the solid electrolyte layer 12. This can prevent short circuits between the first electrode layers 111a, 112a and the second electrode layers 131a to 133a even if the second electrode layers 131a to 133a come into contact with the inner walls of the first openings 141, 142.

Here, the thicknesses of the solid electrolyte layers 12 formed by the inner walls of the first openings 141, 142 are in the range of preferably no smaller than 0.1 μm, more preferably no smaller than 0.5 and most preferably no smaller than 1 μm, from the viewpoint of reliably suppressing conduction between the first electrode layers 111a, 112a and the second electrode layers 131a to 133a. On the other hand, the thicknesses of the solid electrolyte layer 12 formed by the inner walls of the first openings 141, 142 are in the range of preferably no greater than 10 μm, more preferably no greater than 5 μm, and most preferably no greater than 2 μm, from the viewpoint of suppressing a decrease in discharge capacity per unit volume by formation of the solid electrolyte layers 12.

(Second Opening)

The second openings 151, 152 are provided so as to penetrate the second electrode layers 132a, 133a and the solid electrolyte layers 12 adjacent to the second electrode layers 132a, 133a. At this time, the first electrode layers 111a, 112a provided on both sides of the second electrode layer 132a enter the inside of the second opening 151 and come into contact with each other, and the first electrode layers 112a, 113a provided on both sides of the second electrode layer 133a enter the inside of the second opening 152 and come into contact with each other. Hence the first electrode layer 111a and the first electrode layer 112a come into conduction with each other, and the first electrode layer 112a and the first electrode layer 113a come into conduction with each other, leading to generation of currents in the lamination direction. For this reason, even without provision of the end electrodes at the ends of the plane direction of the first electrode layers 111a to 113a, electrons can be exchanged between each of a plurality of secondary battery cells formed in the lamination direction, so as to reduce the transfer distance of electrons on the insides of the first electrode layers 111a to 113a.

Inner walls of the second openings 151, 152 are covered by the solid electrolyte layer 12, as are the first openings 141, 142. This can prevent short circuits between the second electrode layers 131a to 133a and the first electrode layers 111a to 113a even if the first electrode layers 111a to 113a come into contact with the inner walls of the second openings 151, 152.

Shapes of apertures formed on the peripheries of the second openings 151, 152, areas of the apertures in the second openings 151, 152, and thicknesses of the solid electrolyte layers 12 formed on the inner walls of the second openings 151, 152 are similar to those of the first openings 141, 142. Aspect of first electrode layers and second electrode layers having island-like parts In another embodiment, as a power generating element 10b, first electrode layers 111b, 112b and second electrode layers 132b, 133b have island-like parts 171 to 174 encompassed by the first openings 141, 142 and the second openings 151, 152.

FIG. 2 shows a main-part sectional view showing an example of the power generating element 10b.

(Island-Like Part)

The island-like part 173 formed in the first electrode layer 111b is configured so as to be encompassed by the first opening 141. Hence the second electrode layer 131b and the second electrode layer 132b, which are present on both sides of the first electrode layer 111b, come into indirect contact with each other via the island-like part 173, thereby to reduce deformation of the second electrode layers 131b, 132b that occurs due to entry of the second electrode layers 131b, 132b into the first opening 141, while conduction between the second electrode layer 131b and the second electrode layer 132b is ensured by the island-like part 173.

For this reason, it is possible to further facilitate contact between the second electrode layer 131b and the second electrode layer 132b, so as to reduce the internal resistance of the all-solid secondary battery 1. Furthermore, especially on the surface of a green-sheet laminated body before calcining at the time of producing the power generating element 10b, it is possible to reduce the unevenness of the surface caused by the first opening 141, so as to reduce rupturing of the solid-electrolyte green sheet with a small thickness due to this unevenness.

The island-like part 171 formed in the second electrode layer 132b is configured to be encompassed by the second opening 151 for a similar reason to the island-like part 173.

Here, the lower limit for a ratio of the area of the island-like part 173 with respect to the area of the first electrode layer 111b in a plane direction of the first electrode layer 111b is preferably 0.5%, more preferably 2.5%, and even more preferably 3.5%, from the viewpoint of keeping down electric resistance which occurs due to the island-like part 173 and further reducing the internal resistance of the all-solid secondary battery 1. On the other hand, the upper limit for the ratio of the area of the island-like part 173 with respect to the area of the first electrode layer 111b in the plane direction of the first electrode layer 111b is preferably 9.5%, more preferably 7.5%, and even more preferably 4.5%, from the viewpoint of suppressing reduction in battery capacity of the all-solid secondary battery 1 which occurs due to reduction in volume of the first electrode layer 111b caused by the island-like part 173. The other island-like parts 171, 172, 174 have similar area ratios to that of the island-like part 173.

Here, the foregoing area ratio is represented by the following formula.

area ratio (%)=[area of island-like part 173]/[+ areas of first electrode layer 111a and solid electrolyte layer 12, including area of aperture in first opening 141 and area of island-like part 173]× 100

As means for forming the island-like part 173, there can, for example, be used means for irradiating the first electrode layer 111b with a laser to form a void between the aperture formed in the first electrode layer 111b and the island-like part 173. At this time, the solid electrolyte layer 12 is not formed on the surface of the island-like part 173 in its thickness direction while the solid electrolyte layer 12 is formed so as to be adjacent to the first electrode layer 111b, whereby it is possible to suppress conduction between the island-like part 173 and the first electrode layer 111b, while ensuring conduction between the island-like part 173 and the second electrode layers 131b, 132b.

Other Aspect of all-Solid Secondary Battery

In the first electrode layers 111a, 112a (or the first electrode layers 111b, 112b), the first openings 141, 142 may each be provided at one place per layer, but may be provided at two or more places per layer. Especially provision of the first openings 141, 142 at two or more places per layer facilitates a further decrease in sum of transfer distances of electrons from the second electrode layers 131a to 133a (or the second electrode layers 131b to 133b) to the second current collector layer 161 in the power generating element 10, which can thus facilitate further reduction in internal resistance of the all-solid secondary battery 1.

Shapes of the apertures formed on the peripheries of the first openings 141, 142 are not restricted to the circular, but may only be shapes that allow entry of the second electrode layers 131a to 133a (or the second electrode layers 131b to 133b) on the insides thereof.

Furthermore, in the present invention, the "opening" is a hole formed in the thickness direction of the electrode layer and the solid electrolyte layer 12, and it means one with its peripheral shape closed in the case of planarly viewing the electrode layer and the solid electrolyte layer 12, but this is not restrictive, and the opening may also include a notch formed on the peripheries of the electrode layer and the solid electrolyte layer 12, with its outer peripheral shape not closed. However, from the viewpoint of decreasing the sum of electron conduction paths inside the electrode layers, the first openings 141, 142 and the second openings 151, 152 are preferably through-holes in the thickness direction.

Although the first openings 141, 142 and the second openings 151, 152 are provided so as to be mutually superimposed with respect to the lamination direction in the foregoing embodiment, they may be provided so as not to be mutually superimposed with respect to the lamination direction.

Here, for example, when the first openings 141, 142 are provided so as to be mutually superimposed with respect to the lamination direction, the transfer distance of electrons becomes small at the time when a current flows from the second electrode layer 133 formed at the endmost side to the second current collector layer 161 present at the other end side, whereby it is possible to further reduce the internal resistance of the all-solid secondary battery 1.

On the other hand, although not shown, when the first openings are provided so as not to be mutually superimposed with respect to the lamination direction, especially on the surface of the green-sheet laminated body before calcining at the time of producing the power generating element 10, it is possible to reduce the unevenness of the surface caused by the first openings 141, 142, so as to reduce rupturing of the solid-electrolyte green sheet with a small thickness due to this unevenness. As means for providing the first openings so as not to be mutually superimposed with respect to the lamination direction, there can be used means for superimposing centers of the first electrode layers cut out in the circular shape while displacing the first electrode layers little by little in a rotating direction.

Moreover, although each of the three first electrode layers and the second electrode layers have been used in the foregoing embodiments, this is not restrictive. Especially, from the viewpoint of further increasing the output current while enhancing the discharge capacity per unit volume, the number of the first electrode layers and the second electrode layers is preferably no smaller than 10 each, more preferably no smaller than 30 each, and most preferably no smaller than 50 each.

Preparation of all-Solid Secondary Battery

Hereinafter, a method for preparing the power generating element 10a for use in the all-solid secondary battery 1 of the present invention will be described based on FIGS. 1A and 1B.

The power generating element 10a is, for example, prepared by going through: a first sheet preparing step of applying raw material compositions of the first electrode layers 111a to 113a to form first electrode green sheets, thereafter forming openings in portions where the first openings 141, 142 are to be formed, and subsequently applying raw material compositions of the solid electrolyte layers 12 to regions except for partial regions where the after-mentioned second openings 151, 152 are to be formed; a second sheet manufacturing step of applying raw material compositions of the second electrode layers 131a to 133a to form second electrode green sheets, thereafter forming openings in portions where the second openings 151, 152 are to be formed, and subsequently applying the raw material compositions of the solid electrolyte layers 12 to regions except for partial regions where the first openings 141, 142 are to be formed; lamination step of laminating a first sheet and a second sheet such that the opening in the first sheet is superimposed on the partial area of the second sheet and the opening in the second sheet is superimposed on the partial area of the first sheet; and a heated-press step for heating, while pressurizing, the laminated body of the first sheets and the second sheets. It is to be noted that in the present specification, the first electrode layers 111a to 113a and the second electrode layers 131a to 133a are collectively called an electrode layer, and the positive electrode active material and the negative electrode active material are collectively called an electrode active material.

The "green sheet" in the present invention indicates a non-calcined substance of a glass powder or a crystal (ceramic or glass ceramic) powder molded into a laminate shape. Specifically, it refers to one obtained by molding a raw material composition made up of a solid electrolyte, an organic binder, a solvent and the like into the laminate shape. Further, the "green sheet" includes another green sheet and one obtained by applying a raw material composition to a calcined substance of another green sheet.

[Raw Material Composition]

The raw material composition for use in preparation of the all-solid secondary battery 1 contains the solid electrolyte, the electrode active material and the conductive additive, and is in the form of a slurry or a paste. With the raw material composition thus having the desired viscosity and hardness, preparing the electrode layers and the solid electrolyte layers 12 using such a raw material composition can bring the electrode layers, separated by the first openings 141, 142 or the second openings 151, 152, into contact with each other.

Here, the electrode layer to serve as the positive electrode layer contains the positive electrode active material, the solid electrolyte and the conductive additive. On the other hand, the electrode layer to serve as the negative electrode layer contains the negative electrode active material, the solid electrolyte and the conductive additive. Further, the solid electrolyte layer 12 contains the solid electrolyte.

(Solid Electrolyte)

Lithium-ion conductive glass or crystal is used as the solid electrolyte for use in the present step.

Especially, the use of the lithium-ion conductive glass as the solid electrolytes contained in the first electrode layers 111a to 113a and the second electrode layers 131a to 133a can soften the glass in a later-mentioned heated-press step, which thus makes the first electrode layers 111a to 113a and the second electrode layers 131a to 133a flexible, thereby facilitating entry of the first electrode layers 111a to 113a and the second electrode layers 131a to 133a into the first openings 141, 142 and the second openings 151, 152. For this reason, it is possible to enhance adhesion between the electrode layers, so as to reduce the electric resistance between them.

Furthermore, since the use of lithium-ion conductive glass as solid electrolyte can soften the glass at the time of performing the later-mentioned heated-press step, even when the concentration of the solid electrolyte is decreased as concentrations of the electrode active material and the conductive additive contained in the electrode layer are increased, it is possible to obtain the desired lithium-ion conductivity in the electrode layer. Hence it is possible to further reduce thickness of the electrode layer.

On the other hand, since the use of the lithium-ion conductive crystal as the solid electrolyte further enhances the lithium-ion conductivity of the solid electrolyte, it is possible to further enhance the charging/discharging efficiency of the all-solid secondary battery 1.

Here, examples of the lithium-ion conductive crystal may, for example, include crystals of oxides selected from the NASICON type, the $\beta\text{-Fe}_2(SO_4)_3$ type, and the perovskite type. More specifically, it may include $Li_6BaLa_2Ta_2O_{12}$, LiN, $La_{0.55}Li_{0.35}TiO_3$, $Li_{1+x}Al_x(Ti, Ge)_{2-x}(PO_4)_3$, $LiTi_2P_3O_{12}$, $Li_{1.5}Al_{0.5}Ge_{1.5}(PO_4)_3$, $Li_{1+x+y}Zr_{2-x}(Al, Y)_xSi_yP_{3-y}O_{12}$ (where $0.05 \leq x \leq 0.3$, $0.05 \leq y \leq 0.3$). Among those, in particular, $Li_{1+x+z}E_yG_{2-y}Si_zP_{3-y}O_{12}$ is preferable (where $0 \leq x \leq 0.8$, $0 \leq z \leq 0.6$, $0 \leq y \leq 0.6$, $0 \leq j \leq 0.6$, E is one or more selected from Al, Ga, Y, Sc, Ge, Mg, Ca, Ce and Sm, and G is one or more selected from Ti and Zr).

Further, examples of the lithium-ion conductive glass may include amorphous and polycrystalline glass of $LiPO_3$, $70LiPO_3\text{-}30Li_3PO_4$, $Li_2O\text{—}SiO_2$, and $Li_2O\text{—}SiO_2\text{—}P_2O_5\text{—}B_2O_5\text{—}BaO$ types. Among those, in particular, one or more selected from $Li_2O\text{—}P_2O_5$ type glass and $Li_2O\text{—}P_2O_5\text{-}M'_2O_3$ type glass (including one where P has been replaced by Si, and M' is Al or B) are preferable.

Especially, the lower limit for the content of the solid electrolyte contained in the solid electrolyte layer 12 with respect to the whole raw material composition is preferably 5% by mass, more preferably 10% by mass, and most preferably 20% by mass, from the viewpoint of being able to reduce conduction between the first electrode layers 111a to 113a and the second electrode layers 131a to 133a via voids after calcining. On the other hand, the upper limit for the content of the solid electrolyte contained in the solid electrolyte layer 12 is preferably 80% by mass, more preferably 60% by mass, and most preferably 40% by mass, from the viewpoint of enhancing the mechanical strength of the solid electrolyte layer 12.

Here, the contents and composition of the solid electrolyte, the electrode active material and the conductive additive contained in the all-solid secondary battery 1 can be determined by scraping off the solid electrolyte layer 12 and/or the electrode layer constituting the all-solid secondary battery 1, and using an energy loss analyzer or an X-ray analyzer mounted on a field emission-type transmission electron microscope (FE-TEM) or an X-ray analyzer mounted on a field emission-type scanning electron microscope (FE-SEM). By using quantitative analysis or dot analysis as described, the presence or absence of the solid electrolyte and the composition ratio thereof can be found. In the case of using the X-ray analyzer, $Li_2O$ is not directly analyzed, and hence electrons are calculated from the other constitutional components, thereby to estimate the content of $Li_2O$.

(Electrode Active Material)

The positive electrode active material of the electrode active materials is preferably NASICON-type $LiV_2(PO_4)_3$, olivine-type $Li_xJ_yMtPO_4$ (where J is at least one or more selected from Al, Mg and W, Mt is one or more selected from Ni, Co, Fe and Mn, $0.9 \leq x \leq 1.5$, $0 \leq y \leq 0.2$), layer oxides, or spinel-type oxides, for example. Among those, in particular, the positive active material is more preferably made up of $LiMtO_2$ and or $LiMt_2O_4$ (where Mt is one or more selected from Fe, Ni, Co and Mn). This can facilitate occlusion of lithium ions into the positive electrode active material, so as to further enhance the discharge capacity of the all-solid secondary battery. Specific examples of the positive electrode active material to be used may include $LiCoPO_4$, $LiCoO_2$ and $LiMn_2O_4$.

On the other hand, the negative electrode active material is preferably at least one selected from oxides containing NASICON-type, olivine-type or spinel-type crystal, rutile-type oxides, anatase-type oxides, amorphous metal oxides, metal alloys, and the like. Among those, in particular, it is more preferably made up of $Li_{1+x+z}Al_yTi_2Si_zP_{3-z}O_{12}$ (where $0 \leq x \leq 0.8$, $0 \leq z \leq 0.6$, $0 \leq y \leq 0.6$), $Li_4Ti_5O_{12}$ or $TiO_2$. This can facilitate occlusion of lithium ions into the negative electrode active material, so as to further enhance the discharge capacity of the all-solid secondary battery. Specific examples of the negative electrode active material to be used may include $Li_2V_2(PO_4)_3$, $Li_2Fe_2(PO_4)_3$, $LiFePO_4$, $L_4Ti_5O_{12}$, SiOx ($0.25 \leq x \leq 2$) and $Cu_6Sn_5$.

The content of the positive electrode active material and the negative electrode active material contained in the raw material composition of the electrode layers is preferably no smaller than 10% by mass and no greater than 80% by mass with respect to the whole raw material composition. In particular, making this content no smaller than 30% by mass can enhance an occluded amount of lithium ions, so as to enhance the discharge capacity of the all-solid secondary battery 1. For this reason, the lower limit for the content of the positive electrode active material and the negative electrode active material is preferably 10% by mass, more preferably 20% by mass, and most preferably 30% by mass. On the other hand, making this content no greater than 80% by mass allows the solid electrolyte and the below-mentioned conductive additive to have a greater content, whereby it is possible to enhance the lithium-ion conductivity and electron conductivity of the electrode layer, so as to reduce the internal resistance of the all-solid secondary battery 1. For this reason, the upper limit for the content of the positive electrode active material and the negative electrode active material is preferably 80% by mass, more preferably 60% by mass, and most preferably 40% by mass.

(Conductive Additive)

Carbon, metals made up of at least one of Ni, Fe, Mn, Co, Mo, Cr, Ag and Cu, and alloys of these elements can be used as the conductive additive. Furthermore, metals such as titanium, stainless steel and aluminum, and noble metals such as platinum, silver, gold and rhodium may also be used. Since using such material with a high electron conductivity as the conductive additive leads to an increase in the amount of current that can be conducted through the narrow electron conductive path formed in the electrode layer, it is possible to form an all-solid secondary battery having low internal resistance even without the use of a current collector.

The content of the conductive additive is preferably no smaller than 2% by mass and no greater than 15% by mass, more preferably no smaller than 3% by mass and no greater than 10% by mass, and most preferably 3% by mass or more and 7% by mass, in view of the balance between the battery capacity and the electron conductivity of the electrode layer.

(Solvent)

A solvent is used for the raw material composition in order to facilitate application. A known material such as PVA, IPA or butanol may be used as a solvent, but alcohol or water is preferably used in respect of being able to reduce environmental load. Further, an appropriate amount of dispersant may be used in combination in order to obtain a more homogeneous and denser solid electrolyte, and an appropriate amount of surfactant may be used in combination in order to improve degassing efficiency at the time of drying.

(Organic Binder)

An organic binder may be used as the raw material composition. Commercially available binders broadly used as molding assistants for press molding, rubber press, extrusion molding or injection molding may be used as the organic binder. Specific examples may include an acrylic resin, ethyl cellulose, polyvinyl butyral, a metacrylate resin, a urethane resin, butyl methacrylate, and a vinyl copolymer.

[First Sheet Preparing Step]

In a first sheet preparing step, raw material compositions of the first electrode layers 111a to 113a are applied to form first electrode green sheets, and thereafter, openings are formed in portions where the first openings 141, 142 are to be formed with respect to the first electrode green sheets to be the first electrode layers 111a, 112a provided other than at one end. Subsequently, raw material compositions of the solid electrolyte layers 12 are applied to the first electrode green sheets except for partial regions where the below-mentioned second openings 151, 152 are to be formed. It is thereby possible to prepare the first sheets having the openings which penetrate the first electrode green sheets and the solid electrolyte layers 12 in the portions where the first openings 141, 142 are to be formed.

Substrates of PET or the like which were subjected to mold releasing processing may be used as the substrates to be applied with the raw material compositions of the first electrode layers 111a to 113a. Furthermore, for example, a doctor blade, a calendar process, an application process such as spin coating or dip coating, a printing process, a die coater process, or a spray process may be employed for the application of the raw material composition of the first electrode layers 111a to 113a.

Among the first electrode green sheets prepared by application of the raw material composition of the first electrode layers 111a to 113a, openings are formed in portions where the first openings 141, 142 are to be formed with respect to the first electrode green sheets to be the first electrode layers 111a, 112a provided other than at the one end. Thereby, the openings are formed so as to penetrate the first electrode layers 111a to 113a. Means such as laser irradiation, for example, may be employed as means for forming the openings in the first electrode green sheet.

Subsequently, the raw material composition of the solid electrolyte layers 12 are applied to the first electrode green sheets formed with the openings except for regions to be the second openings 151, 152. At this time, it is preferable to perform screen-printing on the first electrode green sheet to apply the raw material composition of the solid electrolyte layer 12. Since this allows integrated handling of the green sheet of the solid electrolyte layer 12 and the first electrode green sheet, it is possible to further reduce the thickness of the solid electrolyte layer 12 so as to enhance the discharge capacity per unit volume of the all-solid secondary battery 1. Furthermore, since the green sheets of the solid electrolyte layers 12 which have a desired size and thickness are formed in desired positions of the first electrode green sheets, it is possible to reduce conduction between the first electrode layers 111a to 113a and the second electrode layers 131a to 133a. Moreover, since the raw material composition of the solid electrolyte layers 12 adheres along the inner walls of the openings in the first electrode green sheets, it is possible to form the first openings 141, 142 with the inner walls thereof covered by the solid electrolyte layers 12. Furthermore, since the solid electrolyte layers 12 also adhere to the outer edges of the first electrode green sheets, it is possible to reduce a short circuit at the end surface of the power generating element 10a.

[Second Sheet Preparing Step]

In a second sheet preparing step, raw material compositions of the second electrode layers 131a to 133a are applied to form second electrode green sheets, and thereafter, openings are formed in portions where the second openings 151, 152 are to be formed with respect to the second electrode green sheets to be the second electrode layers 132a, 133a provided other than at the other end. Subsequently, the raw material composition of the solid electrolyte layers 12 is applied to the second electrode green sheets to be the second electrode layers 132a, 133a provided other than at the other end, except for partial regions where the first openings 141, 142 are to be formed. Accordingly, second sheets are prepared in which the green sheets of the solid electrolyte layer 12 are formed in regions except for partial regions, and which are used other than at the other end. Furthermore, a second sheet is also produced in which the second electrode green sheet of the solid electrolyte layer 12 is not formed, and which is made up of the second electrode green sheet, and used at the other end.

Substrates of PET or the like which were subjected to mold releasing processing can be used as the substrates to be applied with the raw material composition of the second electrode layers 131a to 133a. Furthermore, for example, a doctor blade, a calendar process, an application process such as spin coating or dip coating, a printing process, a die coater process, or a spray process may be employed for application of the raw material composition of the second electrode layers 131a to 133a.

Screen printing is preferably performed on the second electrode green sheet at the time of applying the raw material composition of the solid electrolyte layers 12 to the second electrode green sheets to be the second electrode layers 132a, 133a provided other than at the other end. Since this allows integrated handling of the green sheet of the solid electrolyte layer 12 and the second electrode green sheet, it is possible to further reduce the thickness of the solid electrolyte layer 12, so as to enhance the discharge capacity per unit volume of the all-solid secondary battery 1. Furthermore, since regions which are not formed with the second electrode green sheets of the solid electrolyte layers 12 can be accurately formed in partial regions of the second electrode green sheets to be the second electrode layers 132a, 133a, it is possible to reduce electric resistance in portions where the second electrode layers 131a to 133a are in contact with each other.

Means are used for forming a mask in a partial region of a printing plate in the aforementioned screen printing as the means for providing the regions which are not formed with the second electrode green sheets of the solid electrolyte layers 12 in partial regions of the second electrode green sheets. This can prevent formation of the second electrode green sheet of the solid electrolyte layer 12 in a region covered by the mask of the printing plate so as to efficiently prepare the second electrode layer 132a having the region which is not formed with the solid electrolyte layer 12.

[Lamination Step]

In the lamination step, the first sheets and the second sheets are laminated to form a laminated body such that the openings in the first sheets are superimposed on the regions to be the first openings 141, 142 and the openings in the second sheets are superimposed on the regions to be the second openings 151, 152. This leads to penetration of the opening in the first sheets and the above regions of the second sheet and to penetration of the openings in the second sheets and the above region of the first sheet, thus allowing formation of the first openings 141, 142 and the second openings 151, 152 which penetrate the electrode layers and the solid electrolyte layers 12 adjacent to the electrode layers.

Examples of the embodiment of the lamination step may include using the first sheet and the second sheet formed on the substrates, and peeling the substrate off the laminated second sheet after laminating the second sheet on the first sheet, and peeling the substrate off the laminated first sheet after laminating the first sheet on the first sheet.

After the lamination step, the laminated body of the green sheets may be pressed by CIP (cold isostatic pressing). This facilitates entry of the second electrode layers 131a to 133a on the insides of the first openings 141, 142 and facilitates entry of the first electrode layers 111a to 113a on the insides of the second openings 151, 152, thereby allowing reduction in electric resistance with respect to the thickness direction (lamination direction) of these layers.

[Degreasing Step]

In the degreasing step, an organic binder component contained in the laminated body of the green sheets is heated to gasify the organic binder component for removal. By this step, carbon that remains in the solid electrolyte layer 12 after reducing pressure-heating, thus allowing prevention of a short circuit (electron conduction in the solid electrolyte layer 12).

The heating temperature in the degreasing step is preferably from 350 to 550° C.

[Heated-Press Step]

The heated-press step involves heating the laminated body of the green sheets while pressurizing it to form the solid electrolyte layers 12 and the electrode layers. Accordingly, due to that especially components contained in the solid electrolyte layer 12 and the electrode layer are softened and for some other reason, the second electrode layers 131a, 132a enter the inside of the first opening 141, and the second electrode layer 131a and the second electrode layer 132a come into contact with each other.

Especially, the pressurization facilitates entry of the second electrode layers 131a, 132a on the inside of the first opening 141, thereby to facilitate an increase in contact area of the second electrode layers 131a, 132a, leading to reduction in electric resistance in the contacted portion. That is, since such an electron flowing path as to penetrate the first opening 141 can be easily ensured, it is possible to further reduce the internal resistance of the all-solid secondary battery.

This also applies to the other first opening 142 and the second openings 151, 152.

Especially when the lithium-ion conductive glass is contained in the second electrode green sheet, the heated-press step is performed preferably at a heat treatment temperature higher than the glass transition temperature of the lithium-ion conductive glass, and more preferably at a heat treatment temperature 100° C. or higher than the glass transition temperature of the lithium-ion conductive glass. Since this softens the solid electrolyte and thus makes the second electrode green sheet flexible, it is possible to facilitate entry of the electrode layers on the insides of the first openings 141, 142 and the second openings 151, 152. On the other hand, when the lithium-ion conductive glass is contained in the green sheets of the solid electrolyte layers 12, the solid electrolyte is softened to make the solid electrolyte layer 12 denser, and it is thereby possible to further reduce conduction between the first electrode layers 111a to 113a and the second electrode layers 131a to 133a.

The maximum temperature in the heated-press step is preferably set in such a range where the solid electrolyte powder, the electrode active material and the conductive additive do not melt and the phases of these do not change. For example, the upper limit for this maximum temperature may be preferably 1100° C., more preferably 1050° C., and most preferably 1000° C.

The lower limit for pressure to be applied to the laminated body of the green sheets in the heated-press step is preferably 10 MPa, more preferably 50 MPa, and most preferably 100 MPa from the viewpoint of being able to make such an effect easy to obtain. Furthermore, the upper limit for this pressure is preferably 300 MPa, more preferably 250 MPa, and most preferably 200 MPa from the viewpoint of reducing breakage of the molding die or the laminated body of the green sheets. The laminated body of the green sheets may be pressurized, for example, by mounting an upper die on the molding die for shaping the laminated body of the green sheets and pressurizing them using a hydraulic press or the like.

(Formation of Current Collector)

Subsequently, the first current collector layer 162 is formed so as to come into conduction with the first electrode layer 113a present at the one end, and the second current collector layer 161 is formed so as to come into conduction with the second electrode layer 131a present at the other end. It is thereby possible to take electricity through the current collector so as to perform charging of the all-solid secondary battery 1 and discharging of the all-solid secondary battery 1 may be facilitated. As a specific aspect of laminating the current collector, a thin-film metal layer may be laminated on or bonded to the first electrode layer 113a or the second electrode layer 131a after the heated-press step, or a precursor of a metal layer or an electric conductor may be laminated on the laminated body of the green sheets, and thereafter subjected to the aforementioned heated-press step.

EXAMPLES

Hereinafter, the present invention is described with specific examples.

(Preparation of Solid Electrolyte)

A ceramic electrolyte and a glass electrolyte were used as the solid electrolyte. $Li_{1.3}Al_{0.1}Zr_{1.8}Y_{0.1}Si_{0.1}P_{2.9}O_{12}$ was prepared as the ceramic electrolyte.

As raw materials, powders of $Li_2CO_3$, $ZrO_2$, $Al_2O_3$, $Y_2O_3$ and $SiO_2$ were mixed with a $H_3PO_4$ solution at a stoichiometric ratio, and thereafter heat-treated on a platinum plate at 1480° C. for one hour. The heat-treated mixture of the raw materials was crushed into grains no greater than 200 μm by use of the stamp mill, which was mixed with φ 2 mm YTZ balls and ethanol, and crushed in a planetary ball mill. The obtained powder was dried to obtain a 1.0-μm (D50) ceramic electrolyte powder.

$Li_2O$—$Al_2O_3$—$P_2O_5$ type glass was prepared as the glass electrolyte. The raw materials were weighed so that 50 mol % of $Li_2O$, 9 mol % of $Al_2O_3$ and 41 mol % of $P_2O_5$ were in an oxide-converted composition and uniformly mixed, which were then poured into a crucible and melted at 1250° C. The melted glass was cast in water to prepare a glass electrolyte. This electrolyte is crushed into an average particle diameter of 2 μm (D50) by use of the stamp mill and the planetary ball mill to obtain a glass electrolyte powder.

(Preparation of Positive Electrode Slurry, Negative Electrode Slurry and Solid Electrolyte Paste)

Positive electrode slurry was prepared in such a manner that $LiFePO_4$ (by Mitsui Engineering & Shipbuilding Co., Ltd.) was used as the positive electrode active material and mixed with the aforementioned ceramic electrolyte and glass electrolyte and acetylene black as the conductive additive in the proportion shown in Table 1, which were then mixed with a binder, a dispersant, a wetting agent, a DOS and a solvent in the proportion shown in Table 2 in a ball mill.

Negative electrode slurry was prepared in such a manner that $Li_4Ti_5O_{12}$ was used as the negative electrode active material and mixed with the aforementioned ceramic electrolyte and glass electrolyte and acetylene black as the conductive additive in the proportion shown in Table 1, which were then mixed with the binder, the dispersant, the wetting agent, the DOS (bis(2-ethylhexyl)sebacate) and the solvent in the proportion shown in Table 2 in the ball mill.

The solid electrolyte paste was prepared in such a manner that the aforementioned ceramic electrolyte and glass electrolyte were mixed in the proportion shown in Table 1, which were then mixed with the binder, the dispersant, the wetting agent, the DOS and the solvent in the proportion shown in Table 2 in the ball mill, followed by being kneaded in a triple mill and deformed in a hybrid mixer.

TABLE 1

|  | Ceramic electrolyte | Glass electrolyte | Electrode active material | Conductive additive |
|---|---|---|---|---|
| Solid electrolyte paste | $Li_{1.3}Al_{0.1}Zr_{1.8}Y_{0.1}Si_{0.1}P_{2.9}O_{12}$ 22.5 g | $Li_2O$—$Al_2O_3$—$P_2O_5$ type glass 2.5 g | | |
| Positive electrode slurry | $Li_{1.3}Al_{0.1}Zr_{1.8}Y_{0.1}Si_{0.1}P_{2.9}O_{12}$ 16.5 g | $Li_2O$—$Al_2O_3$—$P_2O_5$ type glass 1.5 g | $LiFePO_4$ 9 g | Acetylene black 2 g |
| Negative electrode slurry | $Li_{1.3}Al_{0.1}Zr_{1.8}Y_{0.1}Si_{0.1}P_{2.9}O_{12}$ 16.5 g | $Li_2O$—$Al_2O_3$—$P_2O_5$ type glass 1.5 g | $Li_4Ti_5O_{12}$ 9 g | Acetylene black 2 g |

TABLE 2

|  | Sintering acrylic binder | Polymer dispersant | Wetting agent | DOS | Solvent |
|---|---|---|---|---|---|
| Solid electrolyte paste | Olicox #2312 (by KYOEISHA CHEMICAL Co., LTD) 6.5 g | Flowlen G700 (by KYOEISHA CHEMICAL Co., LTD) 1 g | None | 0.65 g | Terpineol 10 g |

TABLE 2-continued

|  | Sintering acrylic binder | Polymer dispersant | Wetting agent | DOS | Solvent |
|---|---|---|---|---|---|
| Positive electrode slurry | Olicox KC-250 (by KYOEISHA CHEMICAL Co., LTD) 25 g | BYK180 (by BYK Japan KK) 3 g | Polyflow-KL-100 (by KYOEISHA CHEMICAL Co., LTD) 0.1 g | 2.5 g | Ethanol 25 g |
| Negative electrode slurry | Olicox KC-250 (by KYOEISHA CHEMICAL Co., LTD) 25 g | BYK180 (by BYK Japan KK) 3 g | Polyflow-KL-100 (by KYOEISHA CHEMICAL Co., LTD) 0.1 g | 2.5 g | Ethanol 25 g |

The obtained positive electrode slurry and negative electrode slurry were respectively applied by means of a coater to prepare green sheets 25 μm thick, 18 cm wide and 5 m long, and the sheets were cut into a squares 12 cm on a side to prepare a positive electrode green sheet and a negative electrode green sheet.

Out of those, the positive electrode green sheet was irradiated with a laser by use of a laser processing machine (by Panasonic Industrial Devices SUNX Co., Ltd, LPV-15U), to form an opening having an aperture with a diameter of 1 mm. The negative electrode green sheet was also irradiated with a laser by use of the laser processing machine to form an opening having an aperture with a diameter of 1 mm at a position different from that of the opening in the positive electrode green sheet.

The solid electrolyte paste was printed using a screen printer (by TOKAI SEIKI CO., LTD., SSA-PC250-IPP-L) on the positive electrode green sheet and the negative electrode green sheet formed with the openings so as to have a thickness of 20 μm. At this time, a region with a diameter of 1 mm which was not to be printed was provided at the same positions as those of the apertures of the positive electrode green sheet and the negative electrode green sheet. Furthermore, regions with a diameter of 0.5 mm, not to be printed, were provided at the position on the positive electrode green sheet which was superimposed with the opening in the negative electrode green sheet, and at the position on the negative electrode green sheet which is superimposed with the opening in the positive green sheet. Here, layers of the solid electrolyte paste were thinly formed in the openings in the positive electrode green sheet and the negative electrode green sheet after the screen printing.

Subsequently, the positive electrode green sheets screen-printed with the solid electrolyte paste and the negative electrode green sheets screen-printed with the solid electrolyte paste were alternately laminated. At this time, the opening in the positive electrode green sheet was superimposed on the region with a diameter of 0.5 mm which was provided in the negative electrode green sheet and not to be printed. Subsequently, the opening in the negative electrode green sheet was superimposed on the region with a diameter of 0.5 mm which was provided in the positive electrode green sheet and not to be printed. After repeating such lamination of the positive electrode green sheet and the negative electrode green sheet fifty times, the positive electrode green sheets having neither been provided with the openings nor screen-printed were laminated. The laminated green sheets were vacuum-packed, pressure-shaped by isostatic pressing, and cut into a predetermined size by use of the laser processing machine.

The green sheet formed into the predetermined size was put into a molding die with a diameter of 11 mm, an upper die with a diameter of 11 mm was placed thereon, the atmosphere in the mold was replaced with nitrogen, and thereafter, degreasing was performed at 450° C. in the nitrogen atmosphere for three hours. Subsequently, it was heated up to 600° C. at a temperature-increase rate of 2° C./sec while being applied with pressure of 2000 kg/cm$^2$ by the hydraulic press, and after the temperature reached 600° C., pressure was released to get the temperature down to room temperature to obtain an all-solid secondary battery.

Figure 3:
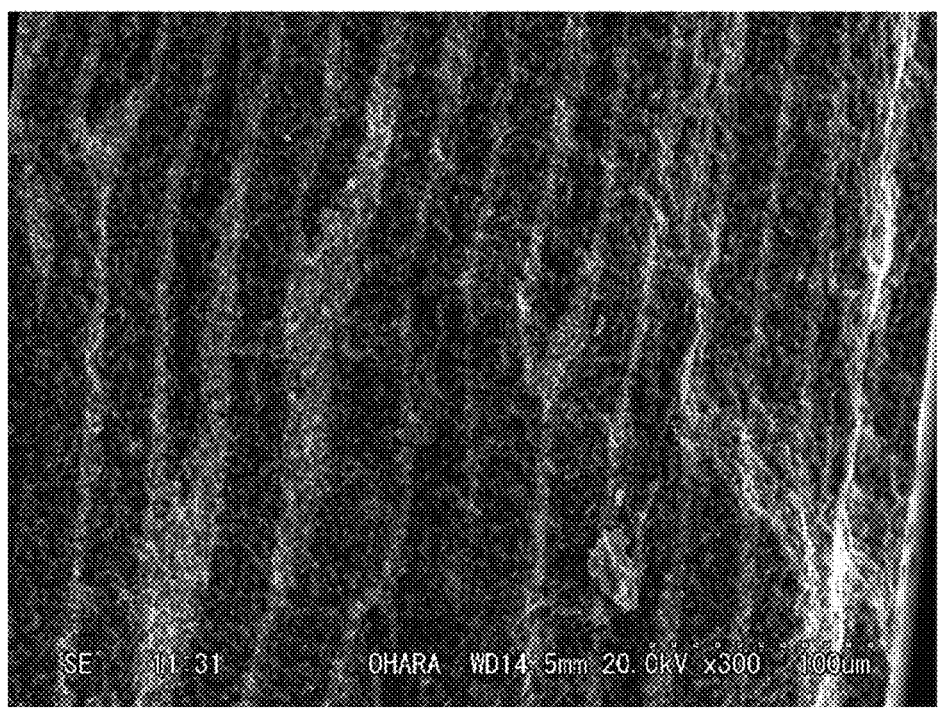
FIG. 3 is an SEM image of an all-solid secondary battery obtained from an example.

FIG. 3 is an SEM image of the all-solid secondary battery obtained in the example. It has become apparent from here that in the all-solid secondary battery of the example of the present invention, the second electrode layers present on both sides of the first electrode layer are in contact with each other.

It has thus become clear that in the all-solid secondary battery of the example of the present invention, the second electrode layer, present on both sides of the first electrode layer, are brought into contact with each other on the inside of the first opening. This infers that it is possible to provide an all-solid secondary battery with a sufficiently high discharge capacity per unit volume, while suppressing an increase in internal resistance, which is the object of the present invention.

Although the embodiments of the present invention have been described in detail above for the purpose of providing examples, the present invention is not restricted to the above embodiments. Those skilled in the art can make many modifications without deviating from the spirit and scope of the present invention, and those are also encompassed by the present invention.

What is claimed is:
1. An all-solid secondary battery, having:
   first electrode layers; and
   second electrode layers laminated on both sides of the first electrode layers with solid electrolyte layers placed in between, wherein
   at least one first opening is provided which penetrates the first electrode layers and the solid electrolyte layers adjacent to both sides of the first electrode layers,
   an entirety of an inner wall of the first opening is covered by solid electrolyte that is the same as the solid electrolyte layers, and
   the second electrode layers present on both sides of the first electrode layers are in contact with each other on the inside of the first opening.
2. The all-solid secondary battery according to claim 1, wherein a plurality of first electrode layers and a plurality of second electrode layers are alternately laminated with the solid electrolyte layers placed in between, the second electrode layers are provided at one end of the lamination direction, and the first opening is provided so as to penetrate each of the first electrode layers and the solid electrolyte layers adjacent thereto.

3. The all-solid secondary battery according to claim 1, wherein the first electrode layers are provided on both sides of the second electrode layers with the solid electrolyte layers placed in between, at least one second opening is provided which penetrates the second electrode layers and the solid electrolyte layers adjacent to the second electrode layers, and the first electrode layers present on both sides of the second electrode layers are in contact with each other on the inside of the second opening.

4. The all-solid secondary battery according to claim 3, wherein an inner wall of the second opening is covered by the solid electrolyte.

5. The all-solid secondary battery according to claim 3, wherein a plurality of first electrode layers and a plurality of second electrode layers are alternately laminated with the solid electrolyte layers placed in between, the first electrode layers are provided at one end of the lamination direction and the second electrode layers are provided at the other end of the lamination direction, the first opening is provided so as to penetrate each of the first electrode layers provided other than at the one end and the solid electrolyte layers adjacent thereto, and the second opening is provided so as to penetrate each of the second electrode layers provided other than at the other end and the solid electrolyte layers adjacent thereto.

6. The all-solid secondary battery according to claim 3, wherein the second electrode layers have an island-like part encompassed by the second opening.

7. The all-solid secondary battery according to claim 1, wherein the first electrode layers have an island-like part encompassed by the first opening.

8. The all-solid secondary battery according to claim 1, wherein the thickness of each of the solid electrolyte layers is in the range of no smaller than 0.1 μm and no greater than 50 μm.

9. The all-solid secondary battery according to claim 1, wherein one of the first electrode layers and the second electrode layers is a positive electrode layer and the other is a negative electrode layer.

10. The all-solid secondary battery according to claim 1, wherein the solid electrolyte layers contain lithium-ion conductive glass or crystal.

11. The all-solid secondary battery according to claim 1, wherein the all-solid secondary battery does not contain an organic substance.

12. The all-solid secondary battery according to claim 1, wherein the first opening is filled by the second electrode layers.

13. An all-solid secondary battery, comprising:

first electrode layers and second electrode layers alternately laminated with solid electrolyte layers positioned between the first electrode layers and the second electrode layers, and a first opening penetrating through the first electrode layers and solid electrolyte layers adjacent to both sides of the first electrode layers, wherein an entirety of an inner wall of the first opening is covered by solid electrolyte that is the same as the solid electrolyte layers, and second electrode layers on opposite sides of the first electrode layers enter into the first opening and directly contact each other in the first opening.

* * * * *